(12) United States Patent
Barnes et al.

(10) Patent No.: US 12,542,201 B2
(45) Date of Patent: Feb. 3, 2026

(54) TRANSFERRING BLOCKCHAIN-BASED TOKENS REPRESENTING BIOSPECIMENS

(71) Applicant: AminoChain Inc., New York, NY (US)

(72) Inventors: Caspar Barnes, New York, NY (US); Maximillian Mathews, Pittsburgh, PA (US); Yurii Lebid, Malaga (ES); Alexander Lorenzo, Hackettstown, NJ (US)

(73) Assignee: AminoChain Inc., New York, NY (US)

( * ) Notice: Subject to any disclaimer, the term of this patent is extended or adjusted under 35 U.S.C. 154(b) by 225 days.

(21) Appl. No.: 18/339,743

(22) Filed: Jun. 22, 2023

(65) Prior Publication Data

US 2024/0430091 A1  Dec. 26, 2024

(51) Int. Cl.
*G16H 10/60* (2018.01)
*G06F 21/62* (2013.01)

(52) U.S. Cl.
CPC ......... *G16H 10/60* (2018.01); *G06F 21/6245* (2013.01)

(58) Field of Classification Search
CPC .... G16H 10/60; G16H 80/00; G06F 21/6245; H04L 9/50
See application file for complete search history.

(56) References Cited

U.S. PATENT DOCUMENTS

| | | | |
|---|---|---|---|
| 11,017,883 B1 | 5/2021 | Escala | |
| 11,676,687 B2 | 6/2023 | Escala | |
| 11,809,403 B2 * | 11/2023 | Shpurov | ............ G06Q 30/0226 |
| 11,915,808 B1 | 2/2024 | Uribe | |
| 11,984,203 B1 * | 5/2024 | Uribe | ..................... G16H 40/67 |
| 2015/0310175 A1 | 10/2015 | Behl | |
| 2018/0060496 A1 | 3/2018 | Bulleit et al. | |
| 2019/0180850 A1 * | 6/2019 | Shvartsman | ........... G16H 10/40 |
| 2022/0166625 A1 | 5/2022 | Stefanich | |
| 2022/0345312 A1 * | 10/2022 | Larmuseau | ........ G06Q 20/3829 |
| 2022/0360457 A1 * | 11/2022 | Bravo | ................... H04L 9/0891 |
| 2024/0029830 A1 | 1/2024 | Escala | |
| 2024/0281561 A1 * | 8/2024 | Ren | ..................... G06F 21/6245 |

FOREIGN PATENT DOCUMENTS

| | | | | |
|---|---|---|---|---|
| CN | 108389046 A | * | 8/2018 | ............. G06F 21/64 |
| EP | 2816496 A1 | | 12/2014 | |
| EP | 3731232 A1 | | 10/2020 | |
| MX | 2020005577 A | | 7/2021 | |
| WO | 2019018776 A1 | | 1/2019 | |
| WO | 2024263958 A1 | | 12/2024 | |

* cited by examiner

*Primary Examiner* — Boris D Grijalva Lobos
(74) *Attorney, Agent, or Firm* — Mintz Levin Cohn Ferris Glovsky and Popeo, P.C.

(57) ABSTRACT

A method, a system, and computer program product for managing tokenized biospecimen transfers are provided. A file including private data associated with one or more donors is retrieved by a biobank node connected to a blockchain network and from a database of a data provider. The file is processed to generate tokens corresponding to the private data, each token representing a biospecimen and being assigned to a respective donor. An inventory is updated by adding identifiers of the plurality of tokens to the inventory. A request to transfer one or more tokens corresponding to a portion of the private data is received. An authorization to transfer the one or more tokens to a target entity is received. The token is transferred to the target entity with a consent to perform one or more operations using the token.

20 Claims, 10 Drawing Sheets

Marketplace 312

Search Specimen Type 314

Specimens 316

▸ Refine 318
- Specimens 322a
- Patient 322b
- Supplier 322c
- Special Attributes 322d

320a
Primary Tissue 324a
Uterus 326a
Disease 328a
Uterine Cancer 331a
Stage 332a
II(TNM, TI, NO) 334a
Patient 336a
81YO F Caucasian 338a

320b
Primary Tissue 324b
Uterus 326b
Disease 328b
Uterine Cancer 331b
Stage 332b
II(TNM, TI, NO) 334b
Patient 336b
81YO F Caucasian 338b

320c
Primary Tissue 324c
Uterus 326c
Disease 328c
Uterine Cancer 331c
Stage 332c
II(TNM, TI, NO) 334c
Patient 336c
81YO F Caucasian 338c

320d
Primary Tissue 324d
Uterus 326d
Disease 328d
Uterine Cancer 331d
Stage 332d
II(TNM, TI, NO) 334d
Patient 336d
81YO F Caucasian 338d

320e
Primary Tissue 324e
Uterus 326e
Disease 328e
Uterine Cancer 331e
Stage 332e
II(TNM, TI, NO) 334e
Patient 336e
81YO F Caucasian 338e

320f
Primary Tissue 324f
Uterus 326f
Disease 328f
Uterine Cancer 331f
Stage 332f
II(TNM, TI, NO) 334f
Patient 336f
81YO F Caucasian 338f

TRANSFERRING BLOCKCHAIN-BASED TOKENS REPRESENTING BIOSPECIMENS

TECHNICAL FIELD

The present disclosure generally relates to blockchain transactions and, more specifically, to transferring blockchain-based tokens representing biospecimens.

BACKGROUND

Some diseases (e.g., aplastic anemia and sickle cell disease) disproportionately affect different races. Race based inequality occurring in clinical research is one of the causes preventing improvement in associated patient outcome. In contrast, diseases that disproportionately affect other races have been extensively studied, leading to improvement in associated patient outcome. Therapies and treatment regimens can be customized toward patient genomics to be used to rebuild trust between diverse research participants and the healthcare system. The development of therapeutics can be equally tailored to patients of all ethnicities and can be integrated in a transparent system that increases the confidence of the participants in the clinical studies involving their own data.

SUMMARY

Methods, systems, and articles of manufacture, including computer program products, are provided for transferring blockchain-based tokens representing biospecimens. In one aspect, a method includes: retrieving, by a biobank node connected to a blockchain network and from a database of a data provider, a file including private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

In some variations, one or more features disclosed herein including the following features can optionally be included in any feasible combination.

In some implementations, administrators of the biobank node list one or more tokens to be available for transfer under stipulated conditions including a material transfer agreement or data usage agreement. In some implementations, listing an acquisition of the one or more tokens by the biobank node includes an agreement to the stipulated material transfer agreement or data usage agreement. In some implementations, the agreement includes a cryptographic transaction and/or signature of a blockchain wallet stored within the biobank node. In some implementations, each token is associated with a donor authentication data that is used for the authorization to transfer a respective token. In some implementations, each of the plurality of authorized biobank nodes provides a permission framework defining authorized token operations. In some implementations, the method further includes: transmitting, to the donor, a notification of the request to transfer the one or more tokens corresponding to the donor.

In some implementations, the file includes the private data, at least a portion of the private data is in a tabulated form. In some implementations, the method further includes: triggering a shipment of an asset associated with the token to the target entity. In some implementations, the authorization to transfer the one or more tokens to the target entity includes the consent received from the donor. In some implementations, the consent includes a dynamic consent (e.g., case by case basis showing how data would be used), an informed consent, and a broad consent. In some implementations, the private data includes at least one of information related to a donated material, donor data, donor case identifiers, and data generated from a research including disease phenotypes, diagnostic criteria, genotypic data, and physiological data. In some implementations, the consent is generated based on data transfer using a private communication channel opened between the donor and the target entity. In some implementations, the private data is retrieved using a data identification tool. In some implementations, the method further includes: determining a source of the private data including the data provider and the donor; and identifying the consent associated with the source of the private data. In some implementations, determining the source includes using an index mapping the datasets to biobank nodes and respective donors. In some implementations, the target entity queries the private data based on a zero-knowledge interaction between the donor (portal, data, etc.) and a data collection entity.

In another aspect, a non-transitory computer-readable storage medium includes programming code, which when executed by at least one data processor, causes operations including: retrieving, by a biobank node connected to a blockchain network and from a database of a data provider, a file including private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

In some variations, one or more features disclosed herein including the following features can optionally be included in any feasible combination.

In some implementations, administrators of the biobank node list one or more tokens to be available for transfer under stipulated conditions including a material transfer agreement or data usage agreement. In some implementations, listing an acquisition of the one or more tokens by the biobank node includes an agreement to the stipulated material transfer agreement or data usage agreement. In some implementations, the agreement includes a cryptographic transaction and/or signature of a blockchain wallet stored within the biobank node. In some implementations, each token is associated with a donor authentication data that is used for the authorization to transfer a respective token. In some implementations, each of the plurality of authorized biobank nodes provides a permission framework defining authorized token operations. In some implementations, the operations further include: transmitting, to the donor, a notification of the request to transfer the one or more tokens corresponding to the donor.

In some implementations, the file includes the private data, at least a portion of the private data is in a tabulated form. In some implementations, the operations further include: triggering a shipment of an asset associated with the token to the target entity. In some implementations, the authorization to transfer the one or more tokens to the target entity includes the consent received from the donor. In some implementations, the consent includes a dynamic consent (e.g., case by case basis showing how data would be used), an informed consent, and a broad consent. In some implementations, the private data includes at least one of information related to a donated material, donor data, donor case identifiers, and data generated from a research including disease phenotypes, diagnostic criteria, genotypic data, and physiological data. In some implementations, the consent is generated based on data transfer using a private communication channel opened between the donor and the target entity. In some implementations, the private data is retrieved using a data identification tool. In some implementations, the operations further include: determining a source of the private data including the data provider and the donor; and identifying the consent associated with the source of the private data. In some implementations, determining the source includes using an index mapping the datasets to biobank nodes and respective donors. In some implementations, the target entity queries the private data based on a zero-knowledge interaction between the donor (portal, data, etc.) and a data collection entity.

In another aspect, a system includes: at least one data processor; and at least one memory storing instructions, which when executed by the at least one data processor, cause operations including: retrieving, by a biobank node connected to a blockchain network and from a database of a data provider, a file including private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

In some variations, one or more features disclosed herein including the following features can optionally be included in any feasible combination.

In some implementations, administrators of the biobank node list one or more tokens to be available for transfer under stipulated conditions including a material transfer agreement or data usage agreement. In some implementations, listing an acquisition of the one or more tokens by the biobank node includes an agreement to the stipulated material transfer agreement or data usage agreement. In some implementations, the agreement includes a cryptographic transaction and/or signature of a blockchain wallet stored within the biobank node. In some implementations, each token is associated with a donor authentication data that is used for the authorization to transfer a respective token. In some implementations, each of the plurality of authorized biobank nodes provides a permission framework defining authorized token operations. In some implementations, the operations further include: transmitting, to the donor, a notification of the request to transfer the one or more tokens corresponding to the donor.

In some implementations, the file includes the private data, at least a portion of the private data is in a tabulated form. In some implementations, the operations further include: triggering a shipment of an asset associated with the token to the target entity. In some implementations, the authorization to transfer the one or more tokens to the target entity includes the consent received from the donor. In some implementations, the consent includes a dynamic consent (e.g., case by case basis showing how data would be used), an informed consent, and a broad consent. In some implementations, the private data includes at least one of information related to a donated material, donor data, donor case identifiers, and data generated from a research including disease phenotypes, diagnostic criteria, genotypic data, and physiological data. In some implementations, the consent is generated based on data transfer using a private communication channel opened between the donor and the target entity. In some implementations, the private data is retrieved using a data identification tool. In some implementations, the operations further include: determining a source of the private data including the data provider and the donor; and identifying the consent associated with the source of the private data. In some implementations, determining the source includes using an index mapping the datasets to biobank nodes and respective donors. In some implementations, the target entity queries the private data based on a zero-knowledge interaction between the donor (portal, data, etc.) and a data collection entity.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3A, 3B, and 3C depict examples of user interfaces for biospecimen transactions, in accordance with some example implementations;

Figure 1A:
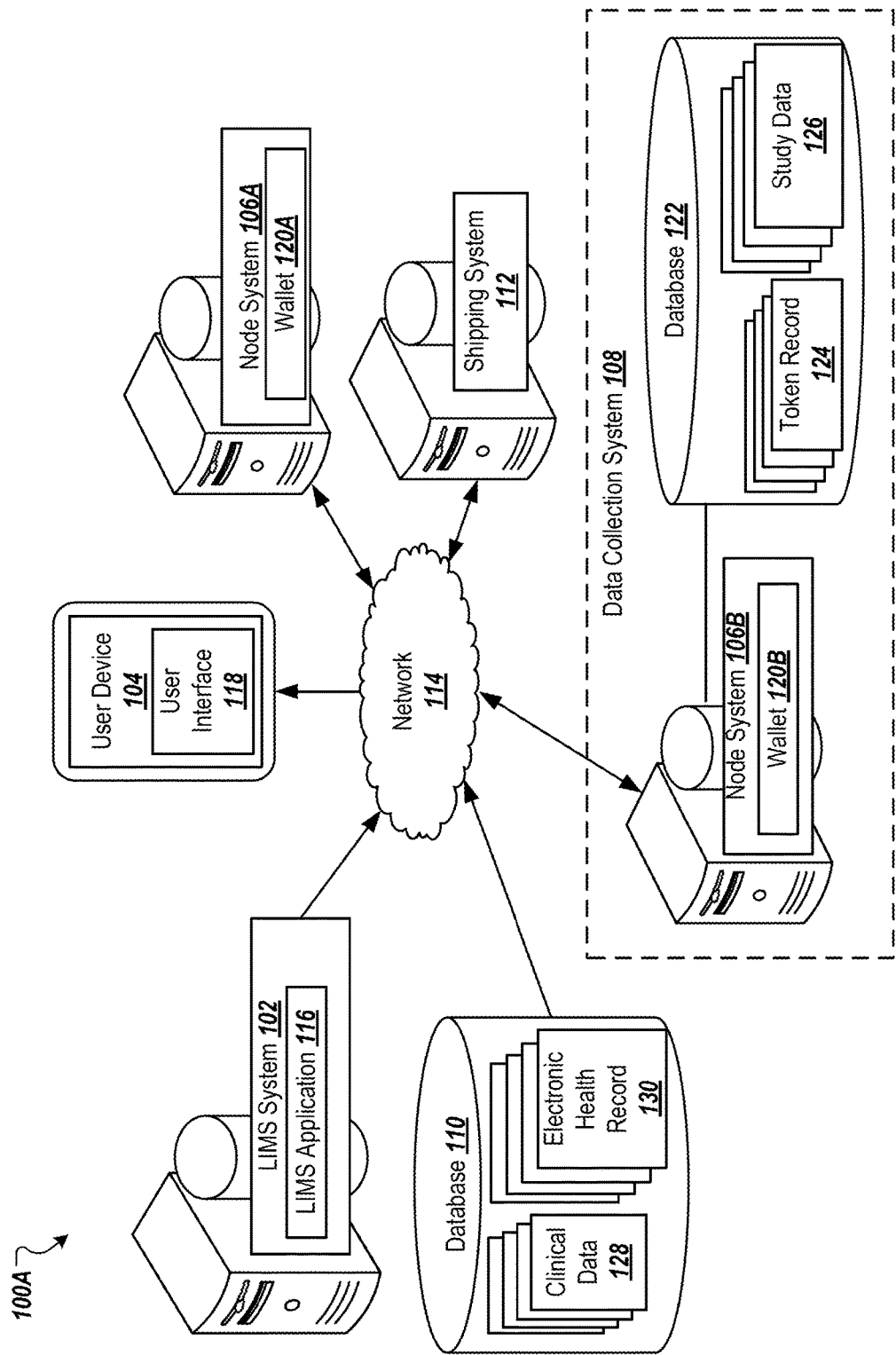
FIGS. 1A-1D depict diagrams illustrating examples of systems, in accordance with some example implementations.

When practical, like labels are used to refer to same or similar items in the drawings.

DETAILED DESCRIPTION

Implementations of the present disclosure are generally directed to blockchain-based transactions. More particularly, implementations of the present disclosure are directed to transferring blockchain-based tokens representing biospecimens. The tokens are transferred through a network of facilities and information about the way, in which the specimen is used is attached to the token a way that enables the original donor to follow the way in which the specimen is used in research and development. Each biospecimen receiving facility (biobank) also stores data pertaining to the biospecimens in a laboratory information management system (LIMS), which collected the donated biospecimens and generated an original data. The biobank physically maintains the specimens (e.g., in a temperature controlled environment) and uses the LIMS to store information about the physically stored material and its research on these specimens. The LIMS can be associated with software applications, for example Electronic Medical Records (EMRs) or custom data capture providers, that enable the researchers to save and access research data pertinent to the relevant specimens use in research (e.g., on either a local or cloud database).

Biobank nodes act as a data bridge to authenticated system participants, who can be authenticated on the blockchain by their association with the tokenized specimens. Some blockchain users that are not associated to the tokenized specimens, such as biospecimen procurement entities, can be approved to access the tokenized, or otherwise associated, data of donated biospecimens, e.g., if identified as a whitelisted entity. The biobank nodes can contain, and hence use, a wallet to perform actions (transactions) on the blockchain and control operations associated with the tokenized biospecimens. Approved users/actors of the biobank nodes can retrieve information (e.g., transaction information) from their LIMS databases and use this as input to create NFTs, which can subsequently be stored in the wallet of the biobank node. The NFTs can include encrypted metadata associated with electronic healthcare records, or research protocol information, pertaining to the donor (e.g., email addresses, and consent information). Further, the biobank node maps an email address from the LIMS to an associated token stored in its wallet. The donor can access a software application to see the token corresponding to their own specimen being handled at a given biobank, and the information shown on their donor portal is information that the node associates with a given token and pulls from the LIMS, and/or further token-connected data that can be stored in EMR/EHR, local or cloud based databases, etc., The described implementations herein avoid the drawbacks of other biospecimen data distribution techniques, such as security issues, reduced visibility of transactions (particularly for research participants), poor record keeping of links between specimen use and consent given, and disproportionate data distribution within clinical studies. Some of the advantages of the described implementations include secure distribution of sensitive data to participants in a privacy preserving and decentralized fashion. The secure distribution of sensitive data is implemented using blockchain-based zero-knowledge interaction between the donor portal, the donor's electronic health records (EHR), and token. The described implementations enable access to real-time status of biospecimens that are transferred through a network of facilities. The transparent operation control enables analysis of the operations performed by institutions to enforce approved consent conditions, increasing process compliance with approved consent conditions.

In some examples, a biospecimen is a human-, animal-, microorganism-, microbe-, or plant-based biological sample, e.g., a healthy or diseased biological sample. For example, a biospecimen is obtained from a living or dead human, animal, or plant, including organs, cells, tissues, internal fluids, solid and fluid excrements, gametes, follicles, bones, or components of these, including proteins or molecules, or pathogens, microorganisms, or microbes that were obtained from these, including viruses, bacteria, and parasites. In some examples, a biospecimen is obtained from the integumentary, skeletal, muscular, nervous, endocrine, cardiovascular, lymphatic, respiratory, digestive, urinary, and/or reproductive systems, etc., or from roots, stems, flowers, fruits, seeds, leaves, etc.

FIG. 1A depicts an example of a system 100A, in accordance with some example implementations. Referring to FIG. 1A, the example system 100A includes a LIMS system 102, a user device 104, a data collection system 108, biobank node 106A, a database 110, a shipping system 112, and a network 114.

The LIMS system 102 can include any form of servers including, but not limited to a web server (e.g., cloud-based server), an application server, a proxy server, a network server, and/or a server pool. In general, the LIMS system 102 can include a computing device including one or more central processing units, graphical processing units, and/or the like. The LIMS system 102 can be configured to provide access to software LIMS applications 116, to enable blockchain-based biospecimen token transfer services by the node systems 108 and biospecimen tracking services to any number of user devices (e.g., the user device 104) over the network 114. The LIMS software application 116 can be any cloud-based, or inhouse/offline software application. The biobank node 106A can act as a data bridge to authenticated system participants using the user device(s) 104, who can be authenticated in the example system 100A by their association to the tokenized specimens. The biobank node 106A can process received orders to transfer tokens representing biospecimens and, in response, can retrieve data from the database 110 and LIMS system 102 and notify the user device 104 of a portion of associated information being transferred. The biobank node 106A can authorize transactions based on consent data retrieved by the LIMS system 102 from the database 110, and based on consent data which can be stored on the blockchain as metadata of a token that represents a donated specimen.

The user device 104 can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. The user device 104 can include a user interface 118. The user device 104 can include a user interface 118, a processor, a memory, a storage component, a bus and any combination of fixed and variable computing components. The user interface 118 can include a user input interface, output interface, and/or a communication interface. The input interface can include a component that permits the user device 104 to receive information, such as via user input (e.g., a touchscreen display, a keyboard, a keypad, a mouse, a button, a switch, a microphone, a camera, and/or the like). Additionally or alternatively, in some embodiments input interface can include a sensor that senses information (e.g., user biometric data and/or the like). The output interface can include a component that provides output information from the user device 104 (e.g., a display, a speaker, one or more light-emitting diodes (LEDs), and/or the like). The communication interface can include a transceiver-like component (e.g., a transceiver, a separate receiver and transmitter, and/or the like) that enables the user device 104 to communicate with other devices via a wired connection, a wireless connection, or a combination of wired and wireless connections. In some examples, the communication interface can permit the user device 104 to receive information from the LIMS system 102 or the data collection system 108 and/or provide information to the LIMS system 102 or the data collection system 108. In some examples, the communication interface includes an Ethernet interface, an optical interface, a coaxial interface, an infrared interface, a radio frequency (RF) interface, a universal serial bus (USB) interface, a Wi-Fi® interface, a cellular network interface, and/or the like. Even though, not illustrated, in some implementations, multiple user devices 104 including different computing system configurations, such as different operating systems, different processing capabilities, different hardware components, and/or other differences can concurrently request updates regarding the biospecimen related transaction data. For example, the user device 104 can interact with the biobank node 106A to visualize data related to their biospecimen, which was accessed from the LIMS software application 116, and/or the data collection system 108. The user interface 118 can enable an entry of a user input including a request to access data associated with a biospecimen including biospecimen transfer data (e.g., location data and study data). The user device 104 can transmit the request to the biobank node 106A. The user device 104 can receive, from the biobank node 106A, notifications including a biospecimen transfer status. The user interface 118 can display the notifications indicating the biospecimen transfer data.

Each biobank node 106A can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices that can be connected to a blockchain network to run on a continuous server. Each biobank node 106A can include an installed blockchain wallet 120A (e.g., wallet software) or can be connected to a blockchain wallet 120A, a node connection module for connecting the biobank node 106A and the wallet 120A, and a node communication module for causing the wallet 120A to perform encrypted communication with the other biobank nodes 106A, via the network 114. The blockchain wallet 120A can include a software package configured independently of the biobank node 106A. The blockchain wallet 120A includes: an address creation module, configured to create an account address in an online or offline environment; and a transaction signature module, configured to perform transaction signature in an online or an offline environment. The blockchain wallet 120A is connected through the node connection module to the biobank node 106A and communicates through the node communication module to send transaction information to other biobank nodes 106A or obtain wallet balance from the blockchain network, when a transaction can be sent or balance can be obtained for transferring blockchain-based tokens representing biospecimens.

The data collection system 108 can include any form of servers including, but not limited to a web server (e.g., cloud-based server), an application server, a proxy server, a network server, and/or a server pool. In general, the data collection system 108 can include a biobank node 106B and a database 122 to manage data collection. The biobank node 106B can be similar in terms of configuration and functions to the biobank node 106A. For example, the biobank node 106B can include an installed blockchain wallet 120B or can be connected to a blockchain wallet 120B that can be similar to the blockchain wallet 120A. The data collection system 108 can be configured to provide access to data managed and/or processed by the biobank node 106B and stored by the database 122, over the network 114. The database 122 can include a storage component that stores data and/or software related to the processing of the data. The database 122 can include a cloud database system environment, an on-premise database system (e.g., system databases, tenant databases, etc.), servers (e.g., name server(s), index server(s), script server(s), etc.) or any other types of databases that can be used as well. In some implementations, the database 122 can store biospecimen related data including token records 124 and study data 126 that can be accessible (e.g., via queries, procedure calls, etc.) by the user device 104, and by the biobank nodes 106A. The database 122 can include a runtime database that holds most recent token records 124 and respective updates of the study data 126 to enable up to date information related to biospecimens.

The database 110 can be similar to the database 122 to include a storage component that stores data and/or software related to biospecimen. For example, the database 110 can be configured to store, and can include applications specifically designed for the storage of, clinical data 128 and electronic health records 130. The clinical data 128 include clinical research results associated with one or more donated biosamples, or the donors themselves, such as clinically relevant information derived from research conducted on biospecimens transferred as de-identified samples, the conducted research being performed in a non-human subject context.

The electronic healthcare records 130 can include email addresses, and consent information associated with biospecimen donors (users of the user device 104). The database 110 can include a multitenant database architecture (e.g., multitenant database containers (MDC), such that each tenant of the LIMS system 102 can customize respective clinical data 128 and electronic health records 130 stored by the database 110 and can be served by separate implementations of the LIMS system 102 when using the LIMS software applications 116.

The shipping system 112 can include a data processing system that can be included in or coupled to one or more vehicles configured to ship biospecimens according to a transfer and handling protocol, in a safe and secure manner. For example, the shipping system 112 can be suitable for physical storing, transporting temperature-sensitive biospecimens and/or transmitting information related to the physical storage and transportation of the biospecimens, including biospecimen location information that can be updated in real time during biospecimen transportation and transmitted over the network 114 to the LIMS system 102, the user device 104, the biobank node 106A and/or the data collection system 108.

The network 114 can include one or more wired and/or wireless networks. In an example, network 114 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

The example system 100A, shown in FIG. 1A, enables transparency of biospecimen ownership for users of the user device 104, and any transactions associated with each stored biospecimen that can be transferred between the biobank nodes 106A and 106B. The process transparency can be facilitated by minting non-fungible tokens (NFT) that serve as digital asset/digital representations of the donated biospecimens that are stored in the respective biobank. In some examples, the NFTs are defined according to the ERC-721 standard. The tokenization process can include a modification to allow for sample fractionalization via token batches, as described in detail with reference to FIG. 4. Each batch of tokens, stored as token records 124, corresponds to a biospecimen owned by a user of the user device 104. The tokens within the batch represent the dispersion of sample ownership. For example, the dispersion can be the result of an immortalized cell line being cloned or a fixed-sized sample being split and then owned by multiple entities. The physical transfer of specimens may be controlled by the LIMS system 102, configured to synchronize transmission of transfer data to users of the user device 104 and transfer of relevant data to the biobank node 106A initiating biospecimen token transaction. In some examples, the transfer of tokenized specimens includes physical shipment of the respective specimens, which includes a release of the respective token escrow, which is determined by the LIMS system 102, a single biobank node 106A, multiple biobank notes 106A via the network 114, external APIs, and/or other oracle sources. The transfer information can be transmitted to the donor portal, to be displayed as notifications, by the user interface 118 of the user device 104. For example, the new information pertaining to the use and data characterization of the token can be relayed to the user of the user device 104, via a biobank node 106A, or multiple biobank nodes 106A, via the network 114.

Figure 1B:
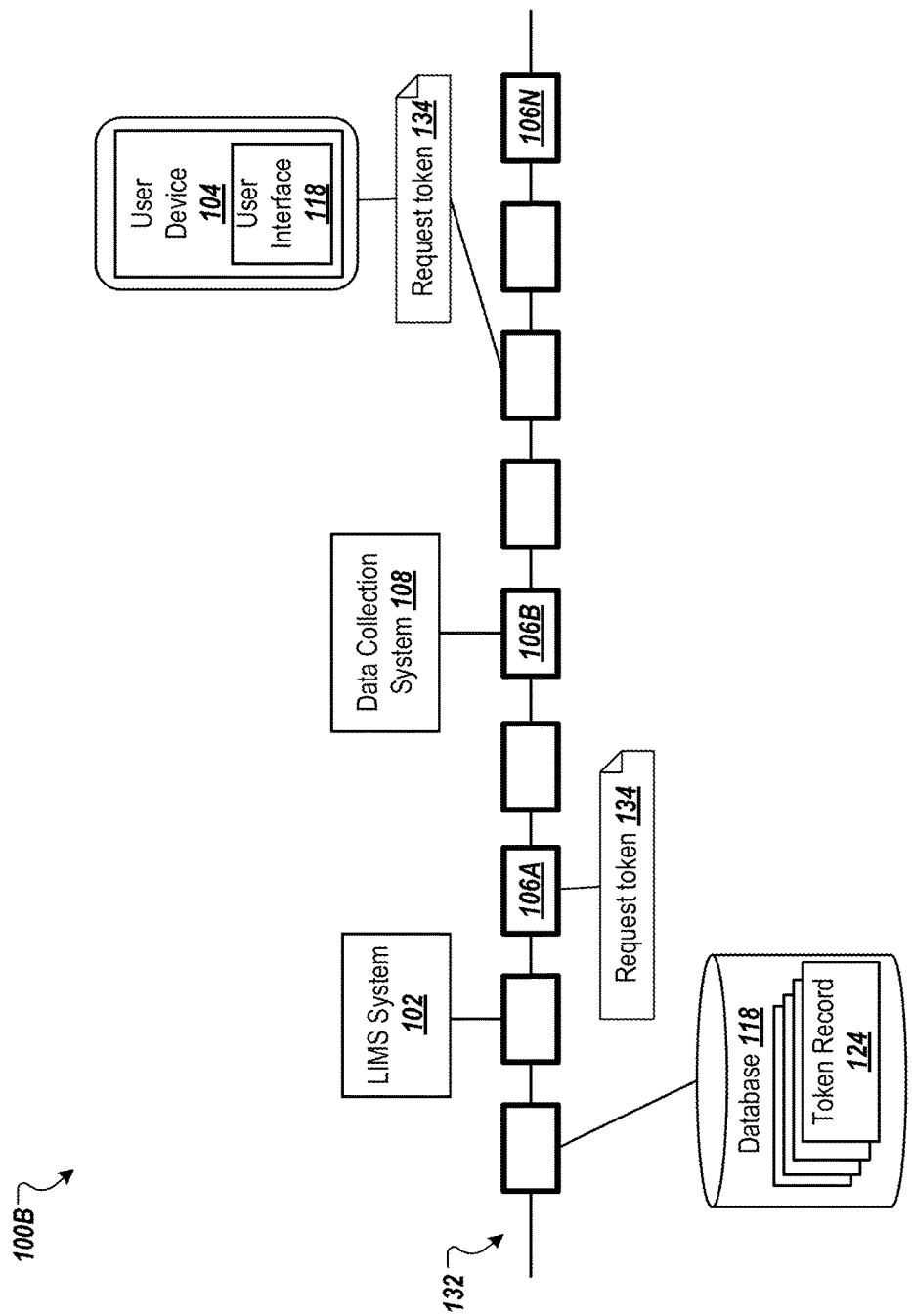

FIG. 1B illustrates another example system 100B, corresponding to a blockchain network implementation of the example system 100A described with reference to FIG. 1A. The example system 100B includes the LIMS system 102, the user device 104, the data collection system 108, the database 110, and a blockchain network 132.

The blockchain network 132 can be a distributed ledger environment configured to automatically execute programs, e.g., smart contracts. In the blockchain network 132, apart from the token being tracked by the distributed ledger on a blockchain, the blockchain network 132 also has programs that can run code associated with the transactions. The code validates conditions and, when set conditions are met, it can automatically make changes to the tokens and/or token records 124, where these changes are also tracked automatically along with the code that made the changes. The blockchain network 132 includes multiple biobank nodes 106A, 106B configured to replicate transaction data according to a consensus algorithm that ensures validation of new information. The blockchain network 132 may be implemented as an immutable mechanism for token issuance and transaction flow management, in which the biobank nodes 106A, 106B involved in issuing and executing electronic token transactions may write and read data and instructions associated with one or more processes using an electronic ledger. Such a distributed ledger provides transparency of information for the permitted biobank nodes 106A, 106B, while eliminating duplication of effort in maintaining the information due to a single source of truth replicated across multiple biobank nodes 106A, 106B. The blockchain network 132 includes a distributed ledger design defining a blockchain system, which employs a chain of biobank nodes 106A-106N to provide security of the information. The biobank nodes 106A-106N are a continuously growing list of records, which are linked using cryptography (e.g., hashing) or similar data security methods. Each biobank node 106A-106N can contain a cryptographic hash of a previous block to provide security, along with a timestamp and the transaction data. The node data linkage ensures that each transaction is recorded in a manner that creates an audit trail. Once recorded, the data in any given biobank node 106A-106N cannot be altered without invalidating the cryptographic hash of all the subsequent biobank nodes 106A-106N. The node data linkage makes the blockchain network 132 resistant to tampering of the recorded transaction data, as all copies would need to be manipulated. The blockchain network 132 may provide the infrastructure, in which the biobank nodes 106A, 106B that manage the token transaction process may communicate by writing to block addresses designated to the biobank nodes 106A, 106B engaged in the process.

As shown, the example blockchain network 132 includes multiple linked data blocks including the biobank nodes 106A, 106B. The blockchain network 132 may be communicatively connected or coupled to the LIMS system 102 and data collection system 108 configured to respectively issue and execute one or more digital tokens, such as a token record 124 associated to a specimen. The LIMS system 102 may store information pertaining to a new sample arriving at a biobank; the biobank node 106A can detect the receipt of new sample arriving at the biobank and can use the information regarding the new sample to mint an NFT, which is stored within the wallet 120A of the blockchain node. The process model for the blockchain network 132 may define parameters and constraints associated with the manner in which token data is to be utilized or manipulated. For example, in some implementations, the rules for managing the request for tokens 134 can include: a token to be recorded on the blockchain network 132, the token to be freely transferred on the blockchain network 132 subject to smart contracts complying with approved consent conditions, the token transfer to be exchangeable for a token (e.g., study data), tokens to be stored or redeemed either on the blockchain network 132 or in another system (e.g., an event provider's point of sale system). The consent given by the biospecimen donor at a given biobank can furthermore be stored on the LIMS system 102 and then associated with the respective NFT via the biobank node 106A, or it can be stored as NFT metadata on the blockchain network 132, in which it pulled/associated and stored and saved via the data collection system 108 or LIMS system 102. The stored consent can serve as a mechanism to provide an immutable and recallable associations between the donated biomaterial and the consent given for research, powered by the blockchain network 132.

The process for managing requested tokens 134 may be implemented by enabling one or more biobank nodes 106A, 106B of the blockchain network 132 to execute token transfer operations with respect to one or more records in the blockchain network 132. The indication received as authorized by a first entity (e.g., a seller, donor, or owner of the token and/or the biospecimen associated with the token, an originator of the biospecimen or an agent of the originator) allows for the exchange of the first token with the second token.

The first token, in some aspects, is associated with ownership information that indicates the first token is owned by the first entity. The first token may also include additional information (e.g., data or metadata), such as a study data 126 corresponding to the token record 124. The ownership of the first token is transferable to other entities (e.g., buyers or resellers) over the electronic ledger environment according to the ownership information associated with the first token as provided in further detail below. Each token or batch of tokens can be mapped to an encrypted email address of the donor to enable transmission of token transfer data to the donor. The donor's email being stored instead of the donor's wallet is a purposeful design decision to abstract blockchain technology away from the donor. Usage of the encrypted email address of the donor allows for a larger donor population to securely and conveniently use the example system 100B. The encrypted email can be used to give data access to the donors about sample usage via the user interface 118, displaying a donor portal. In some implementations, one or more donors may opt into using a wallet address after a biospecimen donation to increase data security, or to receive monetary incentives, which may be permissible in some implementations of biospecimen token transactions.

In some implementations, the blockchain network 132, in response to receiving an indication to exchange the tokens, generates the second token, which is associated with the ownership information and may also include admission information including compliance with consent conditions. The ownership information indicates that the second token is owned by either the second entity, or both the first and second entity, depending on whether the second entity acquires the token in its entirety, or if the token is both transferred to the second entity and remains at the first entity. The admission information indicates that the second entity is to be allowed to use the token representing biospecimens by performing a study pertaining to the biospecimens.

Without limitation and by way of example, in some embodiments, the generation of the token may be committed to one or more database records of a data collection system 108, or records in an electronic ledger environment 100 (e.g., an electronic ledger platform), in accordance with a one or more protocols, such as database 110. The protocols can control and memorialize the downstream exchange of the tokens and the related transactions among multiple biobank nodes 106A, 106B, via the blockchain system 100B, and are configured to commit the tokenized transactions including at least a biobank node system 106A, 106B and/or the blockchain network 132. The tokenized transactions are described in further detail with reference to FIG. 4.

Figure 1C:
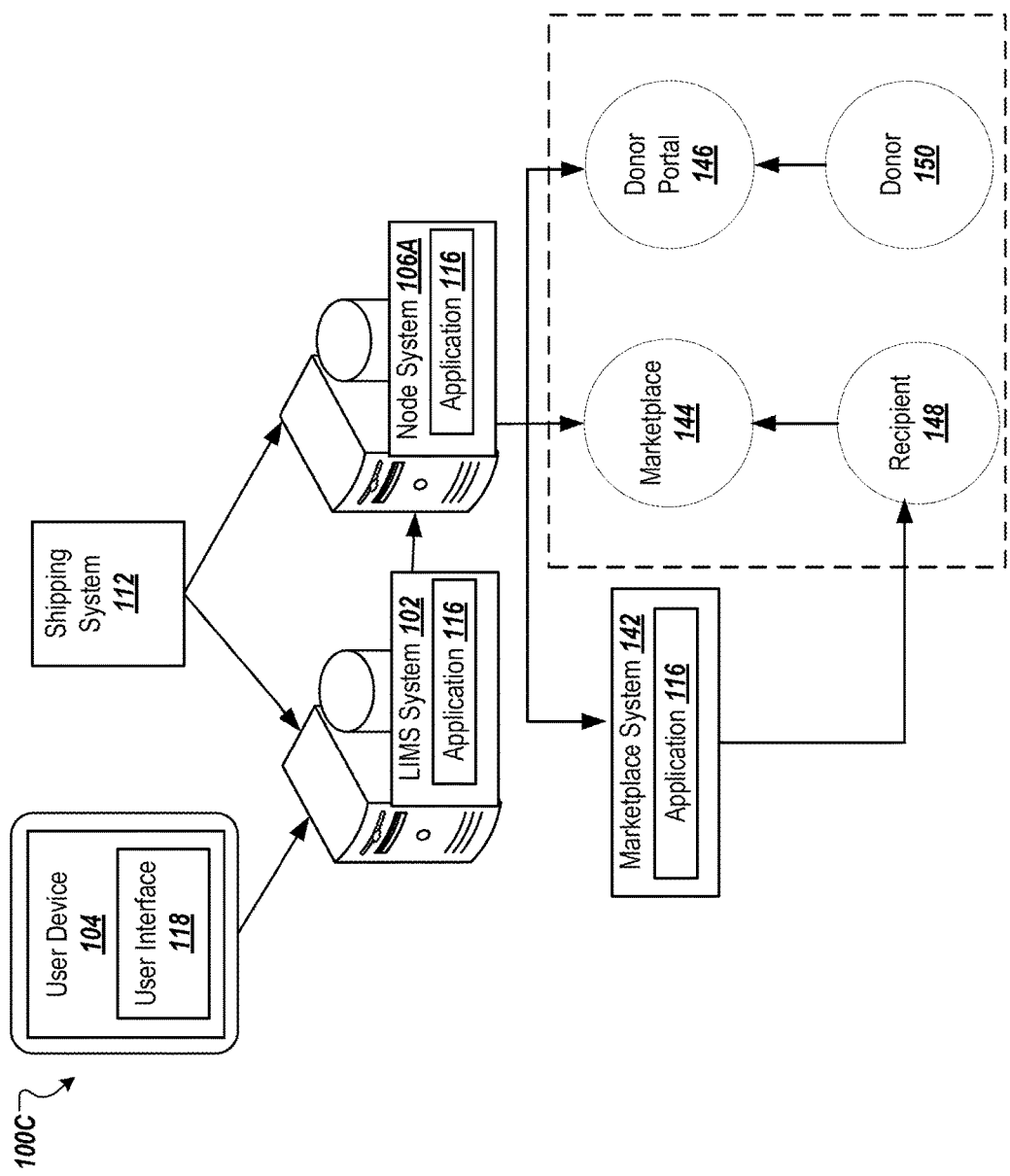

FIG. 1C illustrates another example system 100C, corresponding to a particular variation or implementation of the example system 100A described with reference to FIG. 1A or example system 100B described with reference to FIG. 1B. The example system 100C includes the LIMS system 102, the user device 104, the biobank node 106A, the shipping system 112, and a marketplace system 142. The marketplace system 142 includes the marketplace platform 144 and the donor portal 146. The marketplace platform 144 can be accessible to recipients 148. The donor portal 146 can be accessible to donors 150.

In an example context, instances of biospecimen exchange between non-profit and/or research (e.g., academic) biobanks, can be based on material transfer agreements (MTA's), and instances of data exchange can be based on data usage agreements (DUA's). MTA's and DUA's are types of licensing agreements between two entities (institutions), which stipulate the terms and conditions of material and information exchange, including factors like time of use, scope of research, intellectual property (IP) rights, and other particular clauses and exchange conditions. Biospecimen exchange can be facilitated by human MTA's, and may in some instances include standardized exchange templates, simple letter agreements (SLA's), or other uniform templates proposed by consortia (like the Association of University Technology Managers (AUTM)) or government bodies (e.g., National Institutes of Health). The administration of human MTA's can be conducted by personnel within the sponsored research administration (SPA) office of a given medical body. The marketplace system 142 can use the plurality of tokens representing biospecimens stored within a biobank as a platform to simplify human MTA's and DUA's, and the personnel that can be given authorization to approve such tech transfer agreements, are herein named as "node administrators". Within the example implementation, pointers to data and material usage agreements can be stored at an external location upon completion of agreement process. The pointers can be associated with the data and the materials that are being transferred. The completion of the data and/or material transfer process can trigger an automatic association with the pointers to data and material usage agreements and an automatic payment.

The marketplace system 142 can be coupled to a biobank node 106, or multiple biobank nodes 106A-N that are connected via the blockchain 132, as described with reference to FIG. 1B. The marketplace system 142 can be configured to distribute sensitive data to participants in a privacy preserving and decentralized fashion. The marketplace system 142 utilizes a distributed network of software application 116, which is run by the biobank nodes 106A (owners of tokenized biospecimens). The application 116 of each biobank node 106A receives data from the LIMS system 102, from the database 110, and via the data collection system 108, which contains data pertaining to respective biospecimens. The biobank node 106A can act as a data bridge to authenticated system participants (donors 150) of the marketplace platform 144. For example, admins can be authenticated, by the marketplace system 142 (e.g., blockchain system 132 described with reference to FIG. 1B), by using the association to the tokenized specimens. A node administrator of the marketplace system 142 can authenticate recipients 148 as non-associated participants, having wallets (e.g., wallet 120A described with reference to FIG. 1A) designated for biospecimen procurement (e.g., the node system/wallet within the node system can be used to permit access to the marketplace system). The authentication of recipients 148 can include a verification of whether the recipients 148 are included in a whitelist of the marketplace system 142 (e.g., blockchain system 132 described with reference to FIG. 1B). The software application 116 of the biobank node 106A can use a wallet owned by an administrator to perform actions on the marketplace system 142 and hold the tokenized biospecimens.

In some examples, the donor 150 can be a primary patient receiving ongoing care. For donors being primary patients, the donor portal 146 can serve as a continuous data flow between research conducted on the material and the patient receiving care. For implementations, a biopsy sample donated for research by a cancer patient, can be de-identified before being transmitted to recipients (e.g., primary researchers). The recipients can process the biospecimen result data (e.g., during research or clinical studies) and can generate curated data sets. The user device 104 can retrieve data from the curated data sets and display the retrieved data within the donor portal 146 of the user interface 118 with a notification for the patient indicating received information. The user device 104 can be configured to retrieve data from the curated data sets based on a preference included in respective consent data retrieved from the LIMS system 102 or stored by the database 122 at the time of the biospecimen donation, or based on consent conditions that are stored as metadata of the NFT that represents a donated biospecimen. In some implementations, validation of the curated datasets can be executed before the information can be relayed back to the donor portal. In case of validation, a sample that may have otherwise been de-identified and shipped to a number of biobanks, can be still traceable via its unique tokenization and record keeping on the blockchain 132. For example, the biobank node 106A can be configured to transmit, to the donor portal, in such a way that the sample information, once a given number of nodes validating the same data or research finding has been concluded at the same number of biobank nodes. The biobank nodes 106A-N can also be configured in a way to broadcast messages to one another over the blockchain network 132, to query for validation in a given research finding. The broadcasted messaging can be facilitated via the wallets contained within each blockchain node.

In some cases, node administrators of the biobank node 106A may desire to transfer (e.g., purchase or sell) tokenized biospecimens or their associated data, via MTA's or DUA's. The tokenized biospecimen transactions can be performed by the marketplace system 142, in which specimen availability searches can be conducted by the biobank node 106A, where tokens can be acquired or otherwise exchanged, with or without a financial exchange. In the case that the specimen or the data generated from research thereon is purchased, an automatic royalty payment between both the recipient 148 (managing biobank) and the donor 150 can occur, and the monetary exchange (e.g., payment or financial asset transaction) can be managed by smart contracts on the blockchain network 132. In some implementations, only biobank nodes 106A can acquire primary genetic material from other nodes, in the form of MTA's or DUA's, and typically third party research entities can access the marketplace platform 144 to purchase or query data sets generated by the recipients 148 (biobanks/nodes), and the donors 150 themselves. In some implementations, third party research entities can purchase, acquire and/or gain access to primary material (e.g., biological sample), if the donor consent is upheld and if a sufficient number of factors/parameters are included in the purchase conditions to validate the authenticity of the purchase. The transaction factors and parameters can include, transaction receipts, specimen arrival at proprietary biobank transmitted to the LIMS system 102 and the biobank node 106A, by the shipping system 112.

biospecimen. The LIMS system 102 can store information pertaining to donated material either locally (on a private server) or remotely (on cloud based system). The information can be retrieved by the software application 116 of the biobank node 106A, via application programming interfaces (APIs) or other suitable methods, and equally data can be pushed by the LIMS system 102 to the biobank node 106A via APIs or other suitable methods. The data retrieved by the biobank node 106A from the LIMS system 102 can include, but is not limited to, data generated from research, types of research, donor consent documents, donor case identifiers and other biospecimen related data. The data retrieval process is described in further detail with reference to FIG. 4.

Figure 1D:
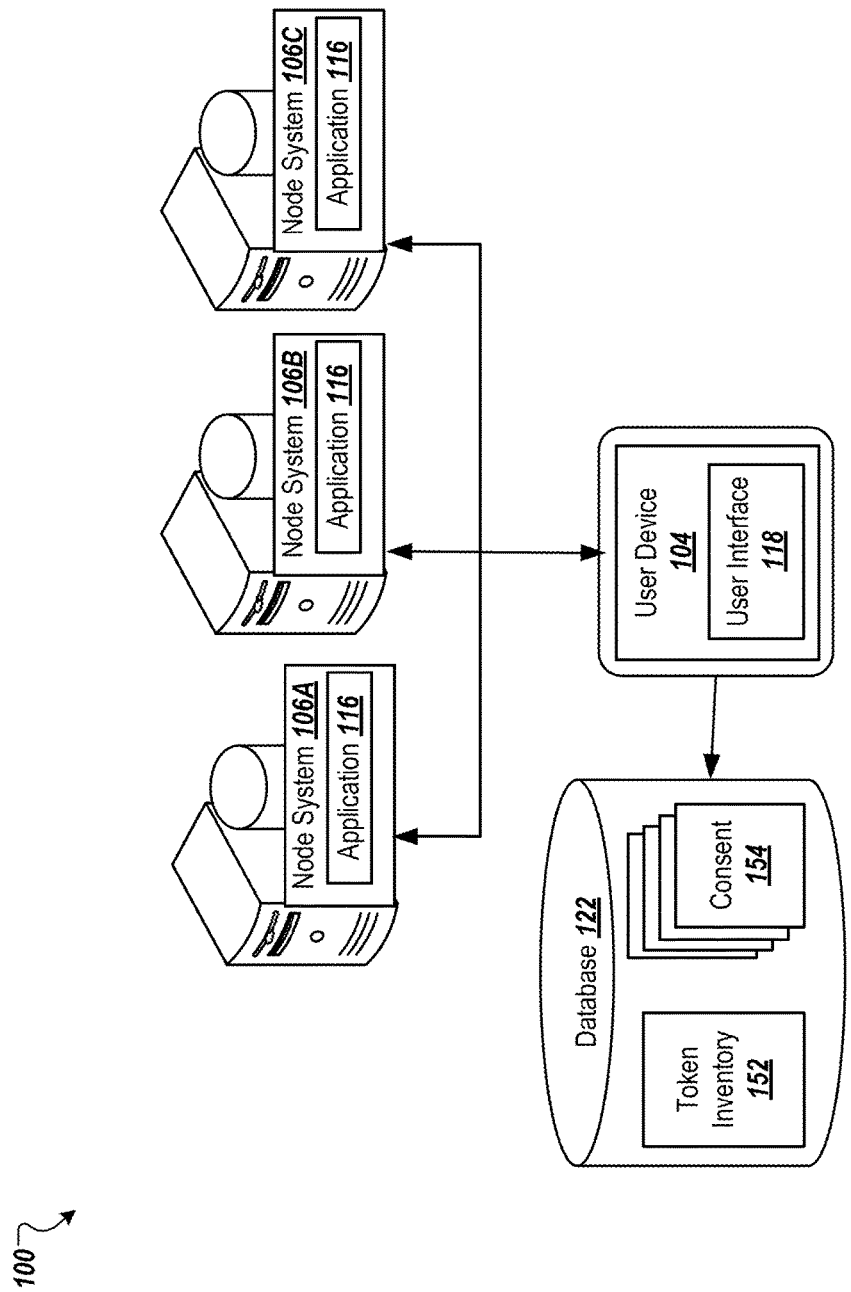

FIG. 1D illustrates another example system 100D, corresponding to a particular variation or implementation of the example system 100A described with reference to FIG. 1A or example system 100B described with reference to FIG. 1B or the example system 100C described with reference to FIG. 1C. The example system 100D includes multiple biobank nodes 106A-106C, the user device 104, and the database 122.

The biobank nodes 106A-106C can include biobanks, such that the example system 100D creates a distributed and decentralized biobank, where all biobanks can access an inventory of tokenized assets 152. The inventory of tokenized assets 152 reflects the physical storage of donated material at a respective biobank node 106A, 106B, or 106C (biobank). In some implementations, the operators of the biobank, which is running a biobank node 106A-106C may have differing consent frameworks 154, through which the donor (e.g., donor 150 described with reference to FIG. 1C) permits use of the donated material. The consent frameworks 154 stored in the database 122 can be filtered by the biobank nodes 106A, 106B, 106C. In response to processing consent frameworks 154, the node systems 106A, 106B, 106C can generate whitelists to identify recipients (e.g., recipients 148 described with reference to FIG. 1C) that comply with the stored consent.

The whitelisted recipients, identified by the biobank nodes 106A, 106B, 106C, can request access to the donated bio-material by accessing the marketplace (e.g., marketplace platform 144 described with reference to FIG. 1C). The security of the example system 100D can be increased by limiting tokenized biospecimen transactions to recipients (e.g., biobank nodes 106A, 106B, 106C) that have been whitelisted by the other biobank nodes 106A, 106B, 106C (and the biobank nodes themselves). The whitelisted biobank nodes 106A, 106B, 106C can access the marketplace platform interface (described with reference to FIGS. 3A-3C), which displays biospecimen data for due diligence for all tokenized biospecimens registered by the biobank nodes 106A, 106B, 106C in the network. An available specimen search on the marketplace platform portal of the user interface 118 only displays results of the tokens that the respective biobank nodes 106A, 106B, 106C are allowed to acquire, based on consent data and the search query itself.

The user interface 118 can be configured to provide a donor portal for donors (e.g., donor 150 described with reference to FIG. 1C) to access (location and study) data about their biospecimens, as described with reference to FIG. 2. The user interface 118 can help facilitate compliance with the stored consent 154. To accomplish compliance with the stored consent 154, data can be requested from the biobank nodes 106A, 106B, 106C for tokens associated with the donor, according to the token inventory 152. The data can be received, by retrieving for all tokens associated with the donor identifier (e.g., identified using an encrypted email). The data can be displayed to the donor by user interface 118 within the donor portal. In some implementations, non-sensitive donation data can be stored on and retrieved from secondary blockchain databases associated with the blockchain network 132, rather than retrieved by the biobank nodes 106A, 106B, 106C, that are connected to the database 110 and the data collection system 108. Further information about the data displayed by the user interface 118 is provided with reference to FIGS. 2-4.

Figure 2:
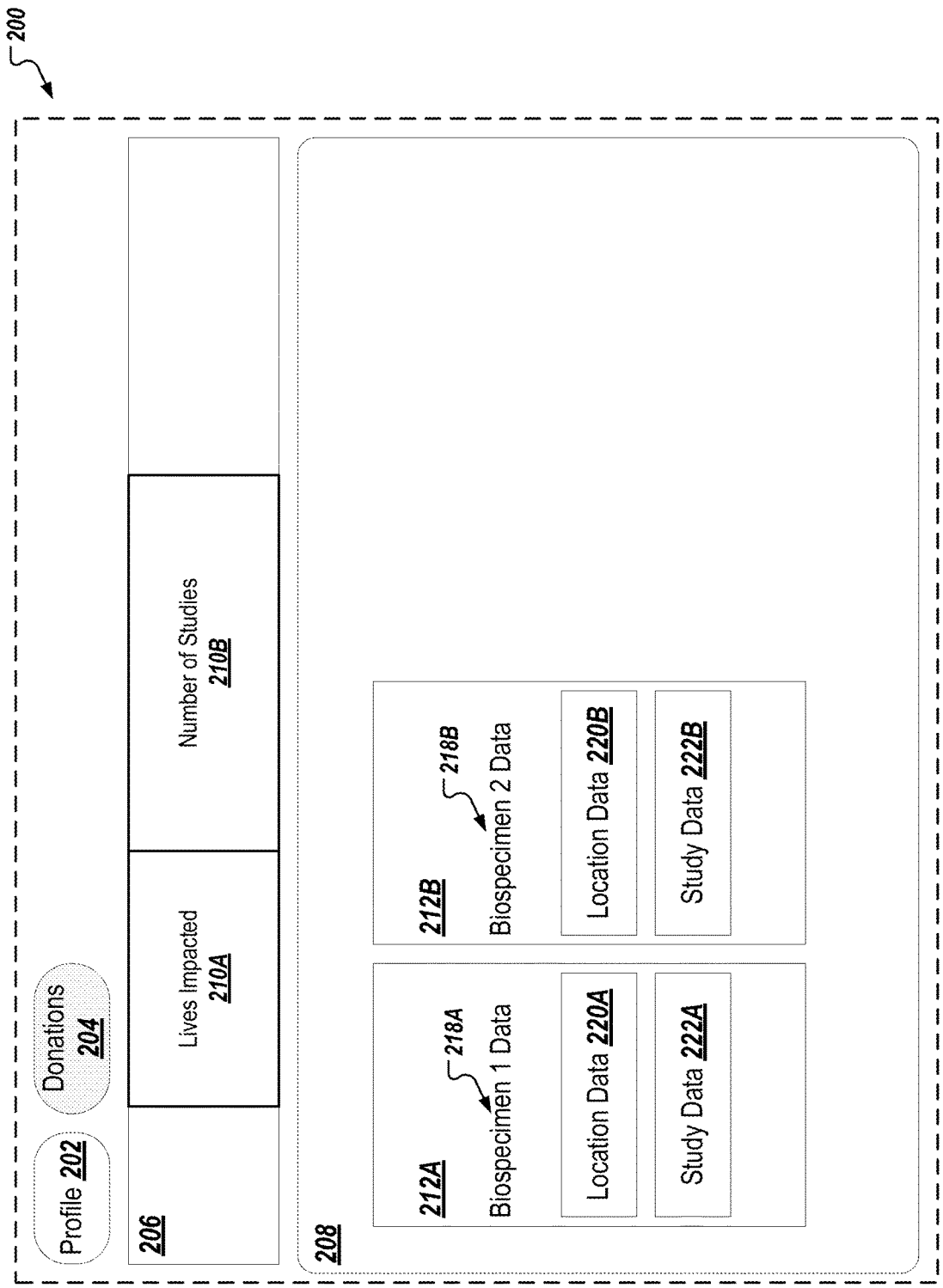
FIG. 2 depicts an example of a user interface of a biospecimen donor, in accordance with some example implementations.

FIG. 2 depicts a diagram of a user interface illustrating an example of a donor portal 200, in accordance with some example implementations. The donor portal 200 can be displayed by a user interface of a donor's user device, such as the user interface 118 of the user device 104 of a donor 150 described with reference to FIGS. 1A-1D. The donor portal 200 can include multiple control buttons 202, 204, a header 206, and a biospecimen data panel 208.

The control buttons 202, 204 can be configured to provide access to donor data. The control buttons 202, 204 can include a profile control button 202 and a donation control button 204. The profile control button 202 can be configured to provide access to the profile data of the authenticated donor. The donation control button 204 can be configured to provide access to donation data associated with the authenticated donor. The donation data can include names of donated materials (electronic biospecimens and/or biological samples), date of donation, and consent forms associated with the donations.

The header 206 can include multiple tabs 210A, 210B that can be allocated to overall information associated with the donations of the respective donor. In some implementations, the tabs 210A, 210B can include statistical information (numerical data) derived from the data associated with the donations of the respective donor and textual identifiers (names) of the statistical information. For example a first tab 210A can include information related to "lives impacted" by the donations and a second tab 210B can include information related to the number of studies performed using the donations.

As illustrated in FIG. 2, the biospecimen data panel 208 can include an assembly grouped biospecimen data 212A, 212B, 212C and control buttons 214, 216. The assembly grouped biospecimen data 212A and 212B enables simultaneous display and visualization of data related to multiple donated biospecimens. Each of the grouped biospecimen data 212A, 212B can include data associated with a single (particular) biospecimen. Each of the grouped biospecimen data 212A, 212B can include a textual identifier 218A, 218B (name or alphanumeric code), location data 220A, 220B, and study data 222A, 222B associated to the respective biospecimen.

In some implementations, the user interface of a donor portal 200 (not illustrated in FIG. 2) can include a map display including one or more markers corresponding to the donated biospecimen data 212A, 212B. Each of the location markers can be selected to access information related to the donated biospecimen data 212A, 212B corresponding to a respective location, including sample identifiers and consent data.

Figure 3A:
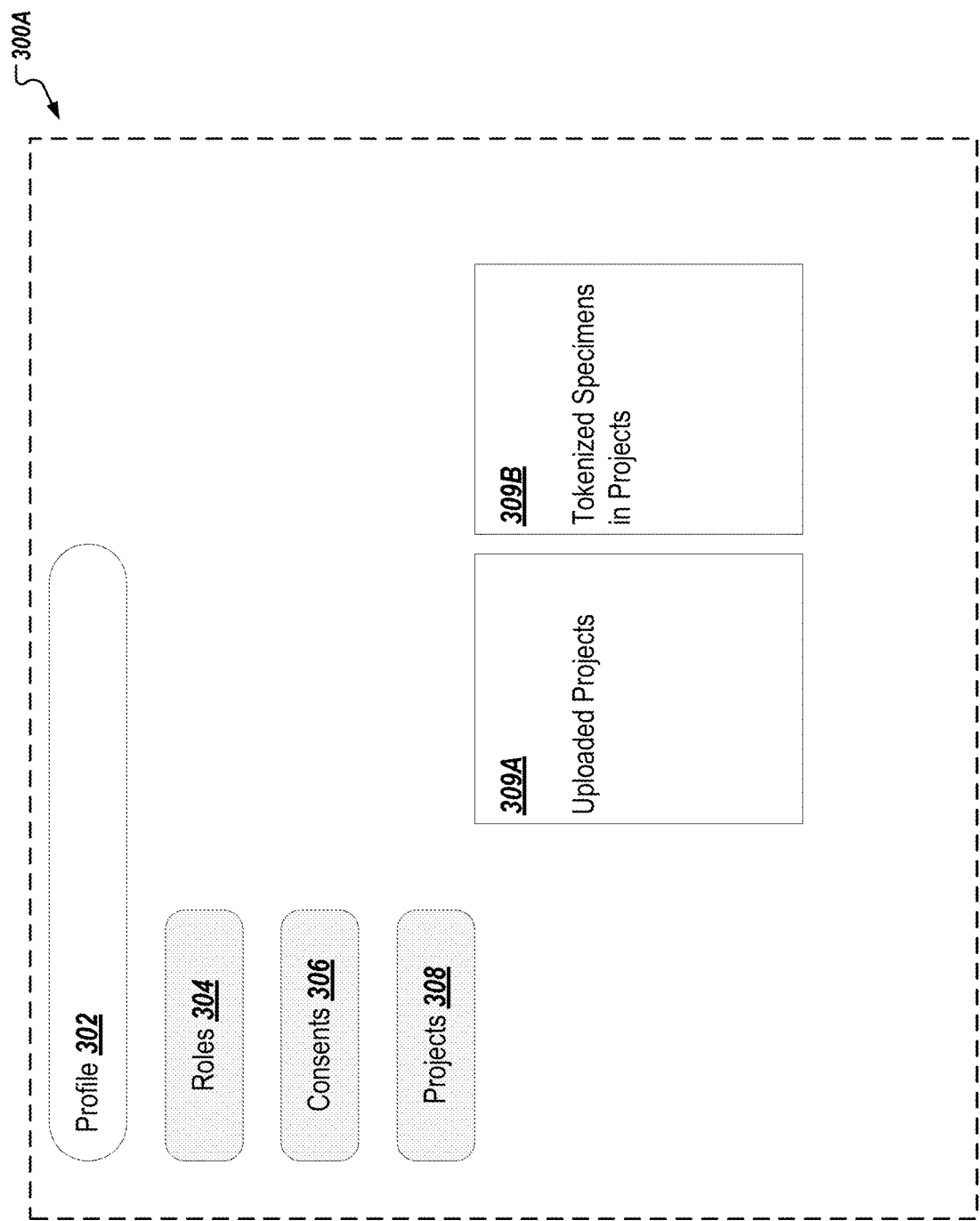
Figure 3C:
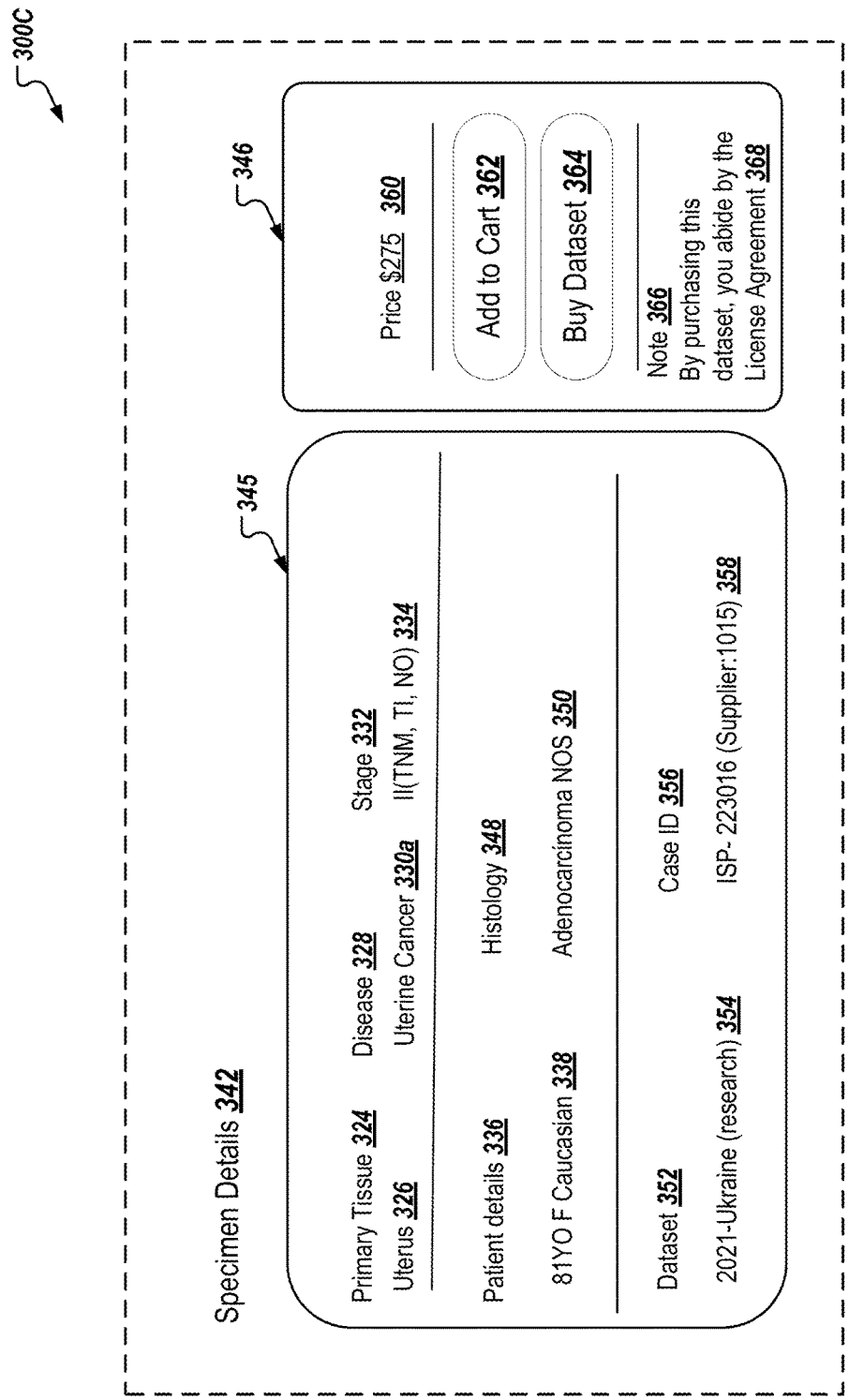

FIGS. 3A-3C illustrate diagrams of user interfaces illustrating examples of marketplace portals 310A, 310B, in accordance with some example implementations. The marketplace portals 300A, 300B, 300C can be displayed by a user interface of a recipient user device, such as the user interface 118 of the user device 104 of a recipient 148 described with reference to FIGS. 1A-1D.

The marketplace portal 300A, shown in FIG. 3A, can include a profile header 302, a role selector 304, a consent selector 306, a project selector 308, and a project data panels 309a and 309b. The profile header 302 can include a profile identifier (e.g., role identifier, entity name, and contact information, such as email and/or physical address). The role selector 304 can include an access point that enables a user input to access a list of user associated or potential roles that the user can select. The consent selector 306 can include an access point that enables a user input to access consent data associated with received samples and/or data. The project selector 308 can include an access point that enables a user input to access project data associated with received samples and/or data. The project data panels 309a and 309b can include an access point that enables a user input to access uploaded project data and tokenized specimen data associated with received samples and/or data.

The marketplace portal 300B, shown in FIG. 3B, can include a marketplace portal identifier 312, a search field 314, a data identifier 316, a refining control panel 318, and a biospecimen data panels 320a-310f. The marketplace portal identifier 312 can include a name (e.g., alphanumeric array) corresponding to the marketplace portal 310A. The search field 314 can include a search box that enables activation of a search function based on an entered (alphanumeric) text. The data identifier 316 can include a name (e.g., "specimens") corresponding to the data type displayed by the marketplace portal 310A. The refining control panel 318 can include multiple drop down menus to refine displayed biospecimens based on types of specimens 322a, patient (disease, race, gender, age) 322b, supplier (biobank identifier) 322c, and/or special attributes 322d. The biospecimen data panels 320a-310f can include biospecimen data selected in response to executing the search function. The biospecimen data panels 320a-310f can include information labels and associated biospecimen information. For example, the biospecimen data panels 320a-310f can include primary tissue labels 324a-314f, primary tissue identifiers 326a-316f, disease labels 328a-318f, disease identifiers 330a-320f (names), disease severity labels 332a-322f (stage), disease severity identifiers 334a-324f, patient data labels 336a-326f, and patient data identifiers 338a-328f. A biospecimen data panel 320a of the marketplace portal 310A, shown in FIG. 3B, can be selected by a user input, triggering the display of the marketplace portal 310B, shown in FIG. 3B.

The marketplace portal 310B, shown in FIG. 3B, can include a specimen portal identifier 342, a biospecimen data panel 344, and an acquisition panel 346. The price panel 360 of the marketplace portal 310B can be shown when recipients 148 that access the portal represent for-profit whitelisted entities that are aiming to purchase either donated biospecimens or research curated datasets, involving a monetary exchange. Non-profit/academic biobanks that act as the recipients when accessing the marketplace portal 310B may or may not see price panel 360, and the price panel 360 in this context would serve to involve a material to monetary value exchange that is not intended for generating profit, rather for covering expenses in shipping the physical material. The specimen portal identifier 342 can include a name (e.g., alphanumeric array) corresponding to the biospecimen portal 310B. The biospecimen data panel 344 can include information labels and associated biospecimen information. For example, the biospecimen data panel 344 can include a primary tissue label 324, a primary tissue identifier 326, a disease labels 328, a disease identifier 330 (name), a disease severity label 332 (stage), a disease severity identifier 334, a patient data label 336, a patient data identifier 338, a histology label 348, a histology identifier 350, a dataset label 352, a dataset identifier 354, a case identifier label 356, and a case identifier 358. The acquisition panel 346 can include transaction information for the associated biospecimen presented in the biospecimen data panel 344. For example, the price panel 346 can include a price 360 in a set (or selected currency), control buttons 362, 364, and, optionally, a note 366. The control buttons 362, 364 can be configured to initiate a transaction related to the associated biospecimen, which could represent a transaction between non-profit/academic biobanks (i.e an MTA or DUA) and for profit biobanks. For example, the add to cart control button 362 can be configured to add the described biospecimen to a cart and the execute MTA/DUA control button 364 can be configured to directly initiate and execute an MTA or DUA between the two institutions of the biobank nodes 106A, and related to the associated biospecimen. The note 366 can describe a transaction condition, such as submission of compliance with a license agreement 368 that can be accessed to display by the user interface. The license agreement 368 in this context can represent the conditions of an MTA or a DUA that a node administrator of a listing biobank node has stipulated, and a separate license agreement view (that is not shown in FIG. 3C) can show the standardized or customized terms and conditions for executing the agreements. In response to determining that a recipient of the marketplace platform executes an MTA or DUA-smart contract, the blockchain network 132 can store the transaction with the associated agreement, providing transparency and advanced record keeping of the provenance and movement of donated biospecimens. Free transactions between research entities can be similarly displayed, to provide entities access to associated consent data. More information about the user inputs that can be received to trigger particular biospecimen related data displays are described with reference to FIG. 4.

Figure 4:
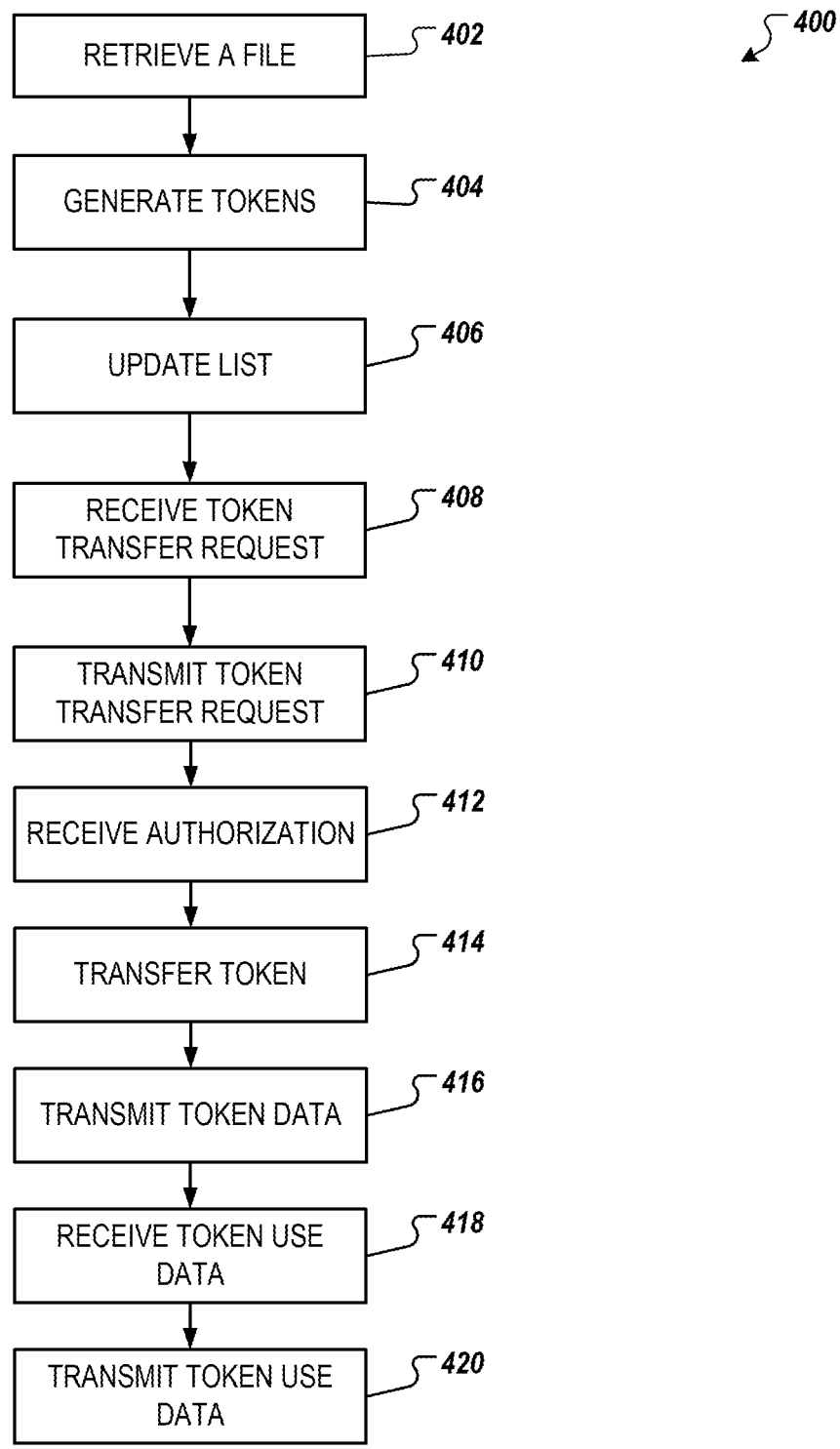
FIG. 4 depicts a process for transferring blockchain-based tokens representing biospecimens, in accordance with some example implementations.

FIG. 4 depicts a flowchart illustrating a process 400 for managing a sequence mechanism in accordance with some example implementations. The process 400 can be executed by the systems 100A-100D shown in FIGS. 1A-1D, and/or the system 500 shown in FIG. 5 or any combination thereof.

At 402, a file is retrieved, by a computing device. For example, the file is retrieved, from the LIMS system by a biobank node 106A, (e.g., biobank node 106A) of a blockchain network, and from a database (e.g., database of a biobank) of a data provider (e.g., medical facility, research facility, biobank etc). The file can include text documents, tables, excel files/csv files, a FASTA file, or other types of files. The file can include private data, such as information related to donated material, donor consent documents and donor consent information, donor email addresses, donor case identifiers, and other private data associated with one or more donors and/or their donation biospecimen (e.g., data donors or biospecimen donors).

At 404, the file is processed to generate one or more tokens corresponding to the private data. Each token can represent a biospecimen and can be assigned to a respective donor. Each token can be associated with a donor authentication data (e.g., email address of the donor or wallet) that is used for future authorization to transfer the respective token. The tokens can include NFTs, such as ERC-721 tokens. The NFTs can include encrypted metadata associated with the electronic healthcare records (e.g., email addresses, phone numbers, and consent information). The LIMS system can use an email address and/or phone number to associate a donor with the NFT. The tokenization process can include data parsing, data fractionation, data separating, data encryption, and/or generation of a digital certificate, an encryption key, and token batch generation. Each batch of tokens can correspond to a biospecimen and can be stored as token records. The tokens within the batch represent the dispersion of sample ownership to obfuscate private data extracted from the file. For example, the dispersion can be the result of biospecimen data with a set sample size that is split into multiple portions that represent biospecimen ownership at multiple biobank nodes and their corresponding physical biobanks. The biobank nodes can maintain a connection between tokenized biospecimens and the data generated from research on them, which may be stored in endogenous databases and may be retrieved, queried or viewed via the marketplace system.

At 406, an inventory list is updated by adding identifiers of the tokens to the inventory. The inventory can be visible to authorized biobank nodes (e.g., authorized biobank nodes 106A-N) including data providers, donors, and whitelisted recipients (entities), via the marketplace system. A portion of the biobank nodes (e.g., node administrators) can stipulate the terms of agreement for an MTA or DUA within the listing of a token.

At 408, a request to transfer one or more tokens corresponding to a portion of the private data is received from a target entity. The request can be received, by the LIMS system or the biobank node (e.g., LIMS system 102 or the biobank node 106A) and from a user device that received a user input entered in the marketplace portal. The request can be received in response to the target entity queries of the private data based on a zero-knowledge (zk) interaction between the donor (portal, data, etc.) and a data collection entity. This zero-knowledge interaction can include third party technologies and/or platforms that provide mathematical proofs in lieu of direct answers, which can serve as a privacy preserving manner to make assumptions about a given data set without seeing the exact content or elements of the dataset. The third party technologies can be features of existing blockchain protocols, or they can be blockchain protocols in and of themselves. The techniques in which these technologies allow zero-knowledge interactions to include secure hashing functions, multi-party computation, zk-SNARKs, zk-STARKs, zk-Roll Ups, Optimistic Roll Ups, privacy preserving data oracles, and any technique that uses either or both a combination of on and off chain data inputs. The zk techniques can also include platforms that allow users to make mathematically verified assumptions about an individual's TLS sessions, without seeing the contents of the individual's TLS session. In some implementations, the target entities include contract research organizations (CROs) and pharmaceutical/biotech companies. CROs are companies that provide outsourced services to bio-pharmaceutical companies. For example, CROs, pharma companies, and/or biotech companies, can obtain/purchase data from a decentralized source, in exchange for a safe, fair, and equitable compensation for the donor and the nodes. The CRO can access the marketplace to query for available datasets (e.g., determine which data sets are available via the decentralized node network). The marketplace can return results of available data/primary specimens depending on the consent that the biospecimen donor provided, as described with reference to FIGS. 3A-3C. In some implementations, the target entities include artificial intelligence developers and/or centers for bioinformatics. If third party developers would like to have access to the data for big data applications, such firms can also procure the data with the permission of the donors via the marketplace. In some implementations, the target entities include entities configured to feed biospecimen data into diagnostic tools and treatment outcomes. For example, the data could be used to feed into diagnostic tools, algorithms, and statistical databases, for example GWAS studies or VBAC calculators. The agreements, in which materials and/or data are exchanged between these target entities can also be formatted as MTA's/DUA's, in which the surveying entity queries the available tokens in the decentralized network and requests to acquire one based on the stipulated MTA/DUA information available, and in which the blockchain can store the transaction agreement.

At 410, a token transfer request is transmitted to receive a transfer authorization. In some implementations, the token transfer request is transmitted to a biobank node, LIMS system, and/or a user device to receive an approval to perform biospecimen transfer. For example, the biobank node and/or LIMS system can process the request to determine a compliance of the intended biospecimen recipient and intended biospecimen use with an associated consent form. The token transfer request may require an additional (e.g., dynamic) consent of the donor. The donor can be requested to approve the transfer of the donated data through the donor portal, on a case by case basis, depending on an intended use of the biospecimen.

At 412, an authorization is received from the biobank node, LIMS system, and/or the donor to transfer the one or more tokens to a target entity (e.g., pharmaceutical company, research lab, or further biobank node in the network of biobank nodes). The authorization can include a consent defining biospecimen usage permission limitations and or associated requests (e.g., requests of study data). The consent includes a dynamic consent (e.g., case by case basis showing how data would be used), an informed consent (e.g., typically informs the donor of how the donated biospecimen can be used in a single study (study data: research data, clinical data), as well as the possible pros and cons of the research outcomes), and a broad consent (e.g., informs donors, to the best of the researcher's ability, what type of research their donated material could be used for, and thereby get permission for primary and theoretical secondary research). The permission can be received from the marketplace or through a suite of customized API's that are connected with the node and/or LIMS systems, or the permissions could be stored in the NFTs that represent the biospecimen donations as NFT metadata.

At 414, the token is transferred to the target entity with consent conditions and stipulated MTA/DUA conditions defining limitations for one or more usage operations of the token and representative biospecimen. In some implementations the transfer of tokenized specimens may be controlled or managed by the LIMS system, configured to synchronize transmission of transfer data from a first node (e.g., biobank) to a recipient node system that initiated the request for the biospecimen token transaction. In some examples, the transfer of tokenized specimens includes physical shipment of the respective specimens, which includes a release of the respective token escrow, which is determined by the LIMS system, the node system, external APIs, and/or other oracle sources. In some implementations the transfer of tokenized specimens can be based on a smart contract transaction performed on a blockchain network, as described with reference to FIG. 1B. For example, purchases or agreements involving a financial asset (monetary) exchange can facilitate automatic royalty and transaction payments which can be managed by smart contracts that can include a master switch configured to identify token aspects that allows data to be deleted for security purposes.

At 416, token data is transmitted to the biospecimen donor. The transfer information can be transmitted to the donor portal, to be displayed as notifications, by the user interface of the user device, as described with reference to FIG. 2. For example, the information pertaining to the use and data characterization of the token can be relayed to the donor being an authenticated user of the user device, via the LIMS software application, the biobank node, or the data collection system.

At 418, token use data is received, by the LIMS system or biobank node, from the token recipient. The token use data can include study results. In some implementations, the marketplace may be used to transmit study results to biospecimen donors, who are willing to participate in clinical trials. In these cases, clinical trial recruitment companies may query for specific donors/participants, or may query for genotypic or phenotypic specifications, and based on the query results, they may send the token use data to the LIMS system, node system, and or data collection system, according to the token use data distribution criteria. The recipients and/or the LIMS system, biobank node, and or data collection system, can process the token use data (e.g., generated during research or clinical studies) and can generate curated token use data sets.

At 420, the token use data is transmitted to the biospecimen donors. The donors can select to participate in a study and receive study results, via the donor portal. In some implementations, approval to participate in a study and receive study results can open a private communication channel between the biospecimen donor and the biospecimen recipient performing the study. The user device can retrieve data from the curated data sets and display the retrieved data within the donor portal of the user interface with a notification for the patient indicating received information. The user device can be configured to retrieve data from the curated data sets based on a preference included in respective consent data retrieved from the LIMS system, biobank node, data collection system, or NFT metadata stored in the blockchain network, or stored by the database at the time of the biospecimen donation.

The example process 400 enables a computationally efficient delivery of tokenized biospecimens introduced by secure transmission protocols including a zero-knowledge interaction between the donor (portal, data, etc.) and a data collection entity. Using the example process 400, the example systems can enable secure distribution of sensitive data to participants in a privacy preserving and decentralized fashion. The secure distribution of sensitive data is implemented using blockchain-based zero-knowledge interaction between the donor portal, the donor's EHR, and token. For example, if researchers can find phenotype data that lies in the donor's EHR or in their donor portal, without ever finding their identity, they can conduct "non-human subject research," which is not reportable to an Institutional Review Board and does not fall under the purview of the common rule. The described example process 400 enables access to real-time status of biospecimens that are transferred through a network of facilities. The centralized operation control enables analysis of the operations performed by institutions to enforce approved consent conditions.

Figure 5:
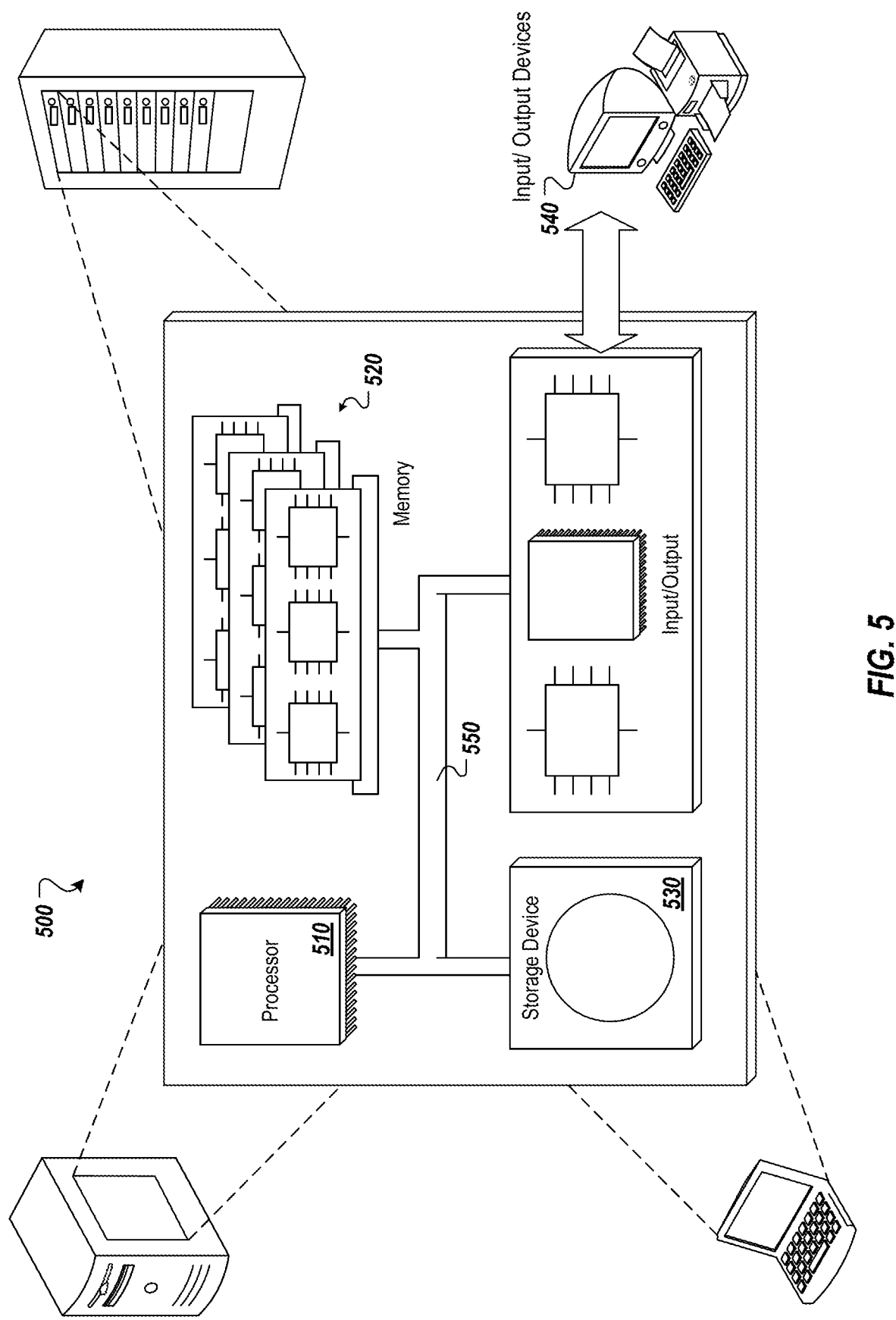
FIG. 5 depicts a diagram illustrating a computing system, in accordance with some example implementations.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A method, comprising: retrieving, by a biobank node connected to a blockchain network and from a database of a data provider, a file comprising private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

Example 2: The method of claim 1, wherein administrators of the biobank node list one or more tokens to be available for transfer under stipulated conditions comprising a material transfer agreement or data usage agreement.

Example 3: The method of any one of the preceding examples, wherein listing an acquisition of the one or more tokens by the biobank node comprises an agreement to the stipulated material transfer agreement or data usage agreement.

Example 4: The method of any one of the preceding examples, wherein the agreement comprises a cryptographic transaction and/or signature of a blockchain wallet stored within the biobank node.

Example 5: The method of any one of the preceding examples, wherein each token is associated with a donor authentication data that is used for the authorization to transfer a respective token.

Example 6: The method of any one of the preceding examples, wherein each of the plurality of authorized biobank nodes provides a permission framework defining authorized token operations.

Example 7: The method of any one of the preceding examples, further comprising: transmitting, to the donor, a notification of the request to transfer the one or more tokens corresponding to the donor.

Example 8: The method of any one of the preceding examples, wherein the file comprises the private data, at least a portion of the private data is in a tabulated form.

Example 9: The method of any one of the preceding examples, further comprising triggering a shipment of an asset associated with the token to the target entity.

Example 10: The method of any one of the preceding examples, wherein the authorization to transfer the one or more tokens to the target entity comprises the consent received from the donor.

Example 11: The method of any one of the preceding examples, wherein the consent comprises a dynamic consent (e.g., case by case basis showing how data would be used), an informed consent, and a broad consent.

Example 12: The method of any one of the preceding examples, wherein the private data comprises at least one of information related to a donated material, donor data, donor case identifiers, and data generated from a research comprising disease phenotypes, diagnostic criteria, genotypic data, and physiological data.

Example 13: The method of any one of the preceding examples, wherein the consent is generated based on data transfer using a private communication channel opened between the donor and the target entity.

Example 14: The method of any one of the preceding examples, wherein the private data is retrieved using a data identification tool.

Example 15: The method of any one of the preceding examples, further comprising: determining a source of the private data comprising the data provider and the donor; and identifying the consent associated with the source of the private data.

Example 16: The method of any one of the preceding examples, wherein determining the source comprises using an index mapping the datasets to biobank nodes and respective donors.

Example 17: The method of any one of the preceding examples, wherein the target entity queries the private data based on a zero-knowledge interaction between the donor (portal, data, etc.) and a data collection entity.

Example 18: A non-transitory computer-readable storage medium comprising at least one program for execution by one or more processors of a first device, the at least one program including instructions which, when executed by the one or more processors, cause the first device to perform operations comprising:

retrieving, by a biobank node connected to a blockchain network and from a database of a data provider, a file comprising private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

Example 19: A system, comprising: at least one computer-readable medium storing computer-executable instructions; and at least processor configured to execute the computer executable instructions to perform operations comprising: retrieving, by a biobank node connected to a blockchain network and from a database of a data provider, a file comprising private data associated with one or more donors; processing, by the biobank node, the file to generate a plurality of tokens corresponding to the private data, each token of the plurality of tokens representing a biospecimen and being assigned to a respective donor; updating, by the biobank node, an inventory by adding identifiers of the plurality of tokens to the inventory, wherein the inventory is visible to a plurality of authorized biobank nodes; receiving, by the biobank node, a request to transfer one or more tokens corresponding to a portion of the private data; receiving, by the biobank node, an authorization to transfer the one or more tokens to a target entity; and transferring, by the biobank node, the token to the target entity and a consent to perform one or more operations using the token.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A method, comprising:
   retrieving, by a biobank node connected to a blockchain network and from a database of a data provider, a file comprising private data associated with one or more donors;
   processing, by the biobank node, the file to generate a plurality of tokens corresponding to the private data, each token of the plurality of tokens representing a biospecimen and being assigned to a respective donor;
   updating, by the biobank node, an inventory by adding identifiers of the plurality of tokens to the inventory, wherein the inventory is visible to a plurality of authorized biobank nodes;
   receiving, by the biobank node, a request to transfer one or more tokens corresponding to a portion of the private data;
   determining a source comprising using an index that maps datasets from the file to biobank nodes and to the one or more donors;
   receiving, by the biobank node, an authorization to transfer the one or more tokens to a target entity based on a consent associated with the determined source; and
   transferring, by the biobank node, the token to the target entity and the consent to perform one or more operations using the token,
   wherein the transferring the token comprises an agreement to a material transfer agreement or data usage agreement, wherein the agreement comprises signature of a blockchain wallet stored within the biobank node.

2. The method of claim 1, wherein administrators of the biobank node list one or more tokens to be available for transfer under stipulated conditions comprising a material transfer agreement or data usage agreement.

3. The method of claim 2, wherein listing an acquisition of the one or more tokens by the biobank node comprises the agreement to the material transfer agreement or data usage agreement under the stipulated conditions.

4. The method of claim 3, wherein the agreement further comprises a cryptographic transaction.

5. The method of claim 1, wherein each token is associated with a donor authentication data that is used for the authorization to transfer a respective token.

6. The method of claim 1, wherein each of the plurality of authorized biobank nodes provides a permission framework defining authorized token operations.

7. The method of claim 5, further comprising:
   transmitting, to the donor, a notification of the request to transfer the one or more tokens corresponding to the donor.

8. The method of claim 1, wherein the file comprises the private data, at least a portion of the private data is in a tabulated form.

9. The method of claim 8, further comprising triggering a shipment of an asset associated with the token to the target entity.

10. The method of claim 1, wherein the authorization to transfer the one or more tokens to the target entity comprises the consent received from the donor.

11. The method of claim 1, wherein the private data comprises at least one of information related to a donated material, donor data, donor case identifiers, and data generated from a research comprising disease phenotypes, diagnostic criteria, genotypic data, and physiological data.

12. The method of claim 1, wherein the consent is generated based on data transfer using a private communication channel opened between the donor and the target entity.

13. The method of claim 1, wherein the private data is retrieved using a data identification tool.

14. The method of claim 1,
   wherein the source comprises the data provider and the donor; and the method further comprises identifying the consent associated with the source of the private data.

15. The method of claim 1, wherein the biospecimen comprises at least one of a human-, animal-, microorganism-, microbe-, or plant-based biological sample.

16. The method of claim 1, wherein the private data associated with the one or more tokens is queried through a zero-knowledge interaction between a donor portal and an electronic health record (EHR) system, such that an identity of the one or more donors remains undisclosed to a querying entity.

17. The method of claim 1, wherein the file comprising the private data includes multimodal data formatted into a structured schema comprising at least tabular data.

18. The method of claim 1, wherein the authorization to transfer the one or more tokens is determined based on a consent record associated with the respective donor of the private data.

19. A non-transitory computer-readable storage medium comprising at least one program for execution by one or more processors of a first device, the at least one program including instructions which, when executed by the one or more processors, cause the first device to perform operations comprising:

retrieving, by a biobank node connected to a blockchain network and from a database of a data provider, a file comprising private data associated with one or more donors;

processing, by the biobank node, the file to generate a plurality of tokens corresponding to the private data, each token of the plurality of tokens representing a biospecimen and being assigned to a respective donor;

updating, by the biobank node, an inventory by adding identifiers of the plurality of tokens to the inventory, wherein the inventory is visible to a plurality of authorized biobank nodes;

receiving, by the biobank node, a request to transfer one or more tokens corresponding to a portion of the private data;

determining a source comprising using an index that maps datasets from the file to biobank nodes and to the one or more donors;

receiving, by the biobank node, an authorization to transfer the one or more tokens to a target entity based on a consent associated with the determined source; and transferring, by the biobank node, the token to the target entity and the consent to perform one or more operations using the token, wherein the transferring the token comprises an agreement to a material transfer agreement or data usage agreement, wherein the agreement comprises signature of a blockchain wallet stored within the biobank node.

20. A system, comprising:

at least one computer-readable medium storing computer-executable instructions; and at least processor configured to execute the computer executable instructions to perform operations comprising:

retrieving, by a biobank node connected to a blockchain network and from a database of a data provider, a file comprising private data associated with one or more donors;

processing, by the biobank node, the file to generate a plurality of tokens corresponding to the private data, each token of the plurality of tokens representing a biospecimen and being assigned to a respective donor;

updating, by the biobank node, an inventory by adding identifiers of the plurality of tokens to the inventory, wherein the inventory is visible to a plurality of authorized biobank nodes;

receiving, by the biobank node, a request to transfer one or more tokens corresponding to a portion of the private data;

determining a source comprising using an index that maps datasets from the file to biobank nodes and to the one or more donors;

receiving, by the biobank node, an authorization to transfer the one or more tokens to a target entity based on a consent associated with the determined source; and transferring, by the biobank node, the token to the target entity and the consent to perform one or more operations using the token, wherein the transferring the token comprises an agreement to a material transfer agreement or data usage agreement, wherein the agreement comprises signature of a blockchain wallet stored within the biobank node.

* * * * *